(12) United States Patent
Burns

(10) Patent No.: US 10,641,019 B1
(45) Date of Patent: May 5, 2020

(54) SCREEN FRAME RETENTION CLIP

(71) Applicant: Prime-Line Products Company, Redlands, CA (US)

(72) Inventor: Les Burns, Mentone, CA (US)

(73) Assignee: Les Burns, San Berardino, CA (US)

( * ) Notice: Subject to any disclaimer, the term of this patent is extended or adjusted under 35 U.S.C. 154(b) by 286 days.

(21) Appl. No.: 15/490,087

(22) Filed: Apr. 18, 2017

(51) Int. Cl.
| | | |
|---|---|---|
| E05C 3/04 | (2006.01) | |
| A47F 7/00 | (2006.01) | |
| F16B 2/20 | (2006.01) | |
| E06B 9/52 | (2006.01) | |

(52) U.S. Cl.
CPC ............. *E05C 3/04* (2013.01); *A47F 7/00* (2013.01); *F16B 2/205* (2013.01); *E06B 2009/527* (2013.01)

(58) Field of Classification Search
CPC .... F16B 2/205; E06B 2009/527; E05C 3/041; E05C 3/0433; E05C 3/04; A47F 7/0007; A47F 7/0014; A47F 7/00
USPC ........................................................ 292/195
See application file for complete search history.

(56) References Cited

U.S. PATENT DOCUMENTS

| | | | | |
|---|---|---|---|---|
| 1,446,364 A | * | 2/1923 | Wheeler | E05F 11/00 160/369 |
| 2,508,662 A | * | 5/1950 | Carper | E06B 9/52 292/202 |
| 2,718,423 A | * | 9/1955 | Eaddy | E06B 9/52 292/256 |
| 3,704,563 A | * | 12/1972 | Waller | E06B 3/5481 160/369 |
| 5,217,263 A | * | 6/1993 | Peterson | E05C 19/14 292/112 |
| 9,038,698 B2 | * | 5/2015 | Gibbs | F16B 2/22 160/369 |
| 9,140,058 B1 | * | 9/2015 | James | E06B 9/24 |

* cited by examiner

*Primary Examiner* — Nathan Cumar
(74) *Attorney, Agent, or Firm* — James Quinton

(57) ABSTRACT

A clip for fastening a screen to a frame the has a top and a bottom; an opening extending through the clip. A connector extends through opening to attach the clip to a door or window frame. A projection extends a vertical distance from an end of the clip for holding a screen in place. The clip bottom has a circular recess surrounding the opening. Attachable segments extend from the bottom of the clip having a diameter and a thickness and having an opening for receipt of a connector. The attachable segments bottom has a circular recess surrounding the attachable segments opening. The attachable segment top has a protruding ring that mates with the circular recess on the clip bottom or with a circular recess surrounding an attachable segment opening. The segments raising the vertical distance of the projection so the projection contacts the screen.

7 Claims, 6 Drawing Sheets

SCREEN FRAME RETENTION CLIP

FIELD OF THE INVENTION

The field of the invention is related to systems for the securing a screen for a door or window to a frame. In particular, the invention relates to screen frame retention clip.

BACKGROUND OF THE INVENTION

Screen clips are well known in the art. Since the nineteenth century many screen frame retention devices were available. The early devices had pre-determined lengths. Such devices were made of various materials and had various clip head shapes, and related to wood frames made to order. Early screen frame clips usually included a threaded clamp and/or spring.

There are quick release screen clips in the art. See U.S. Pat. No. 9,038,698 (Gibbs) and U.S. Pat. No. 5,217,263. Some clips have a leg to secure the clip to a frame. See U.S. Pat. No. 2,718,423 (Eaddy).

Problems can arise with the clips of the prior art as the distance between the screen and frame can be widely variable. Thus, a large number of clips of different vertical heights were required. This is often not realized by the consumer resulting in purchasing the wrong size. Moreover, this results in the hardware store stocking numerous different sized products that takes up valuable shelf space. There is still a need in the art for a clip that has an easily variable height.

SUMMARY OF THE INVENTION

According to the invention, a clip for fastening a screen to a frame is provided. The clip has a top and a bottom. An opening with a preselected diameter is located at one end of the clip. The opening extends through the clip for receipt of a connector to attach the clip to a doorframe or window frame. The clip has a projection for holding a screen in place. The projection extends a preselected vertical distance from the clip top at the end opposite from the end that has the opening. The clip bottom has a circular recess surrounding the opening. When a connector is mounted in the opening, the clip rotates about the connector and moves from a screen retention position where the projection engages the screen and holds the screen in place to a screen release position where the screen does not contact the projection an can be removed.

According to the invention, one or more spacers can be attached to the bottom of the clip adjacent the bottom of the opening. The spacers have a preselected diameter and a preselected thickness that is a vertical height. An opening is provided in each spacer for the connector to pass through the spacer. Each attachable spacer bottom has a circular recess surrounding the spacer opening. Each attachable spacer top has a protruding ring that mates with the circular recess on the clip bottom or with a circular recess surrounding an attachable spacer opening. By including one or more of the attachable spacers, the vertical distance of the projection can be raised a desired amount so the projection contacts the screen and holds said screen in place when the clip is in the screen retention position. When the spacers are attached to one another and to the clip all the openings align for receipt of the connector.

The preferred embodiment of the present invention is illustrated in the drawings and examples. However, it should be expressly understood that the present invention should not be limited solely to the illustrative embodiment.

DETAILED DESCRIPTION OF THE INVENTION

Figure 1:
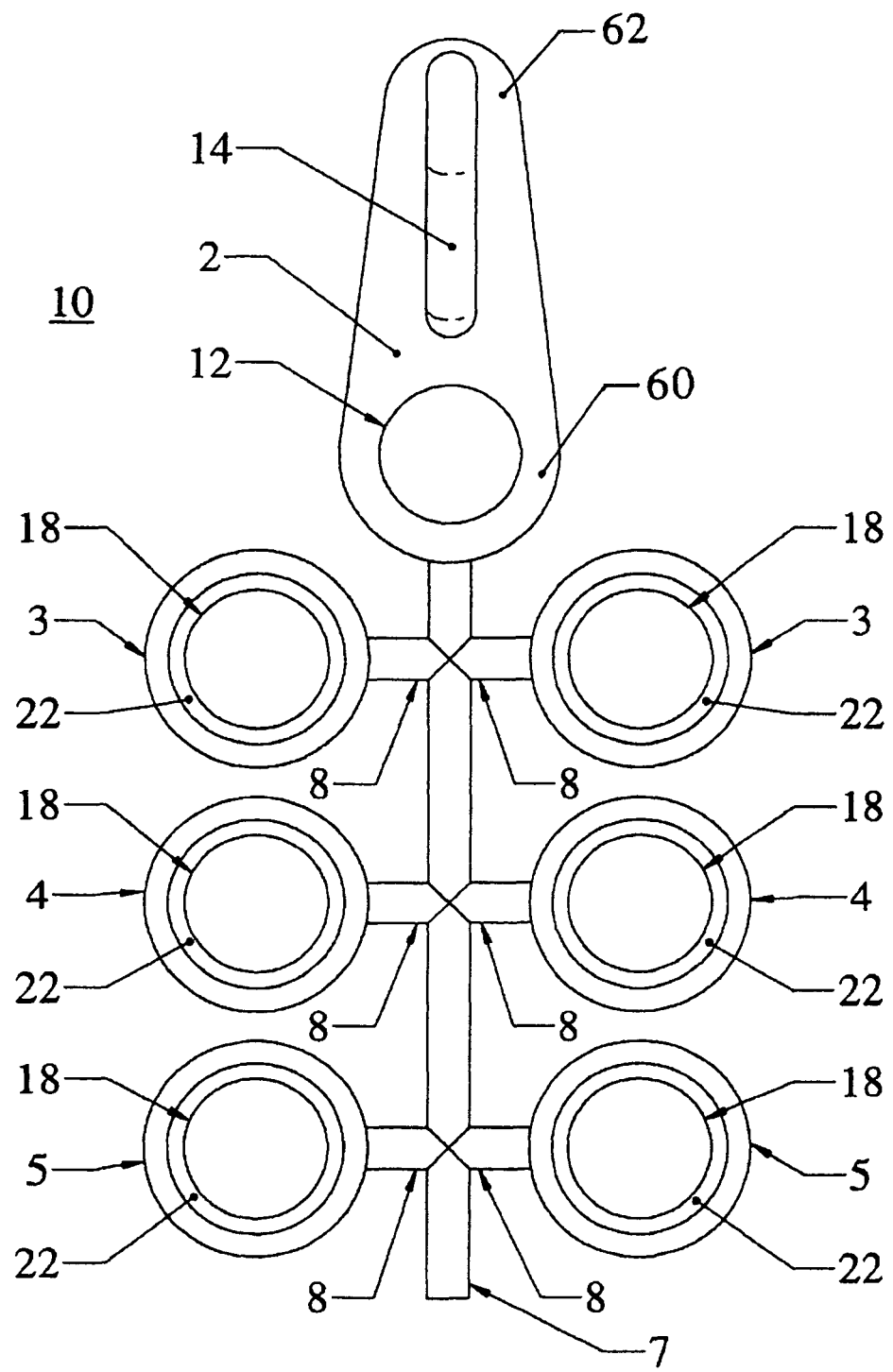
FIG. 1 is a top view of a screen clip and attachable spacers according to the invention prior to use.
Figure 2:
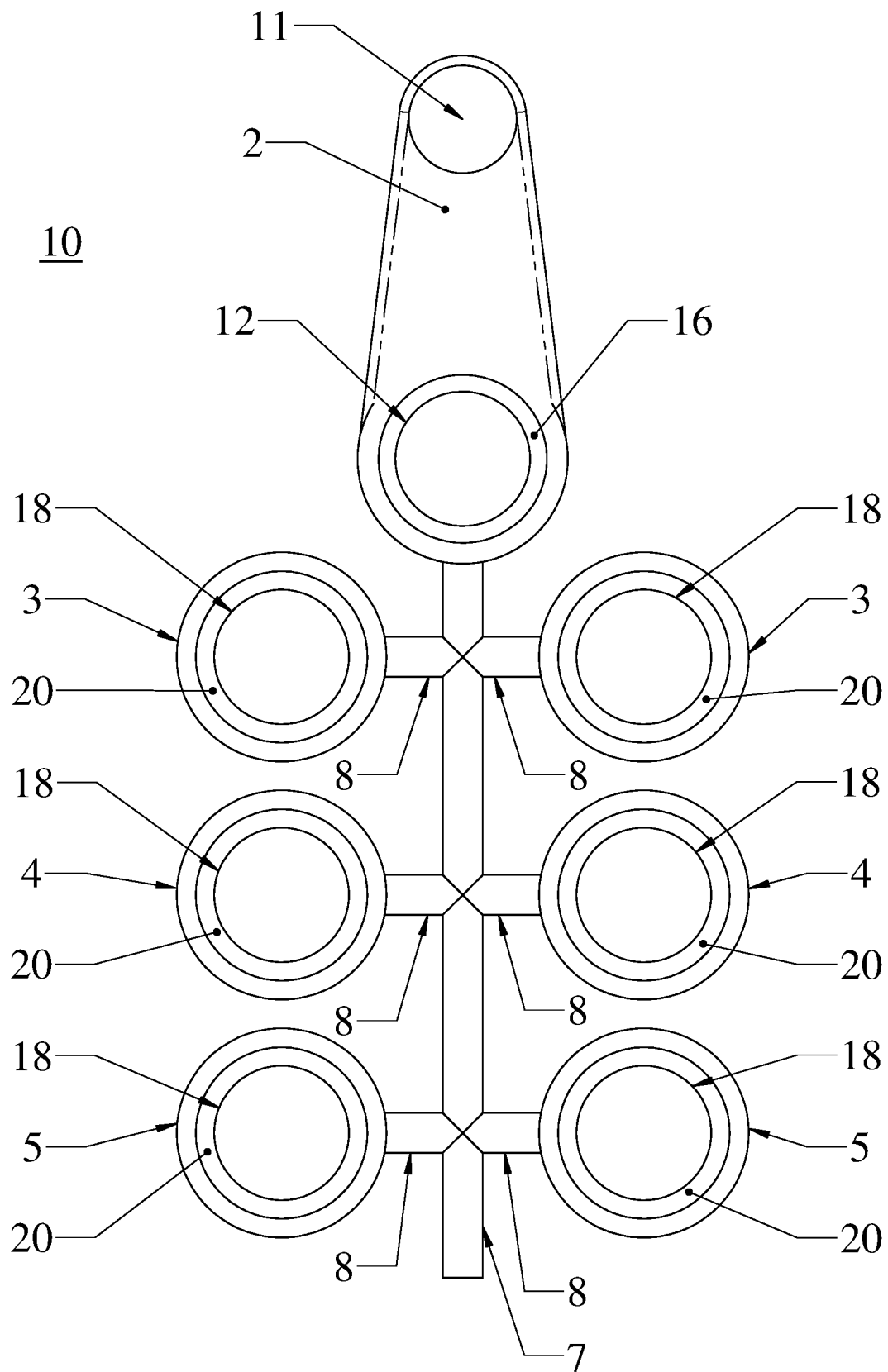
FIG. 2 is a bottom view of a screen clip and attachable spacers according to the invention prior to use.
Figure 3:
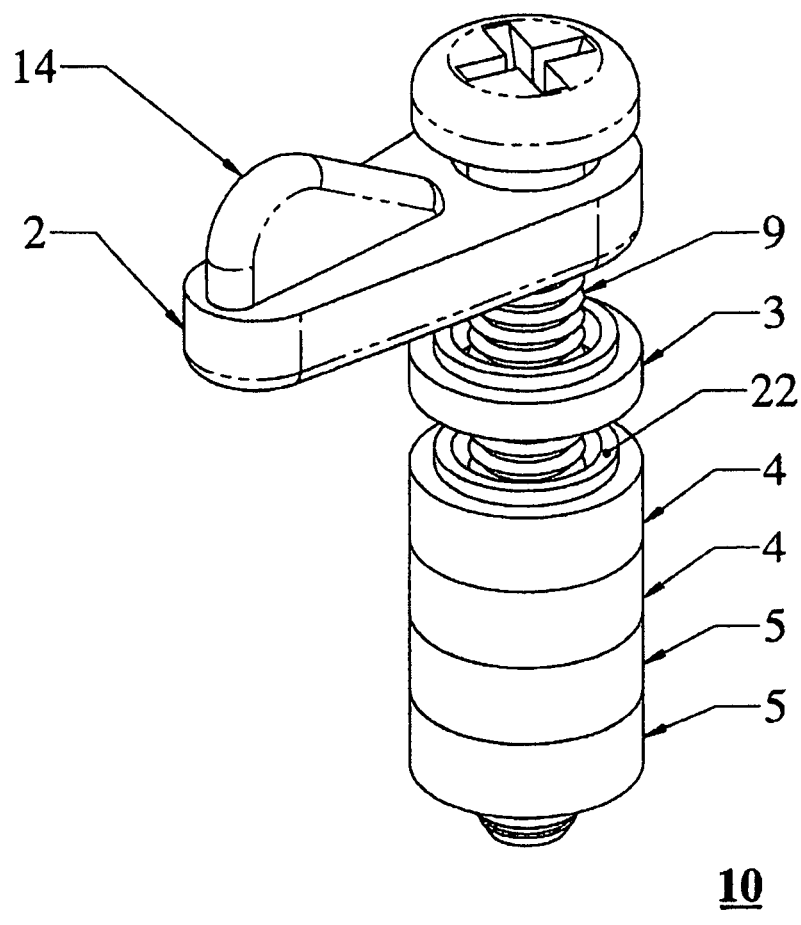
FIG. 3 is a perspective side view of a screen clip and stack attachable spacers.
Figure 4:
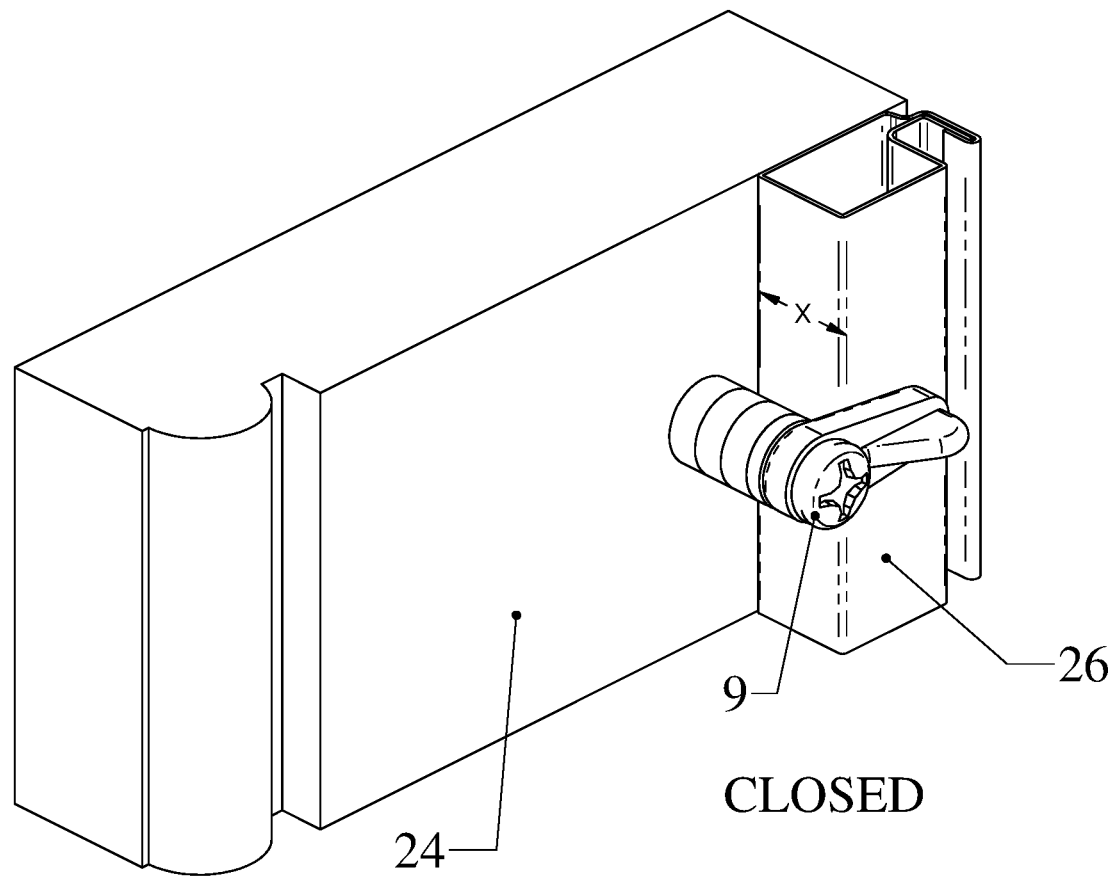
FIG. 4 is a perspective side view of a screen clip and attachable spacers installed in the closed position.
Figure 5:
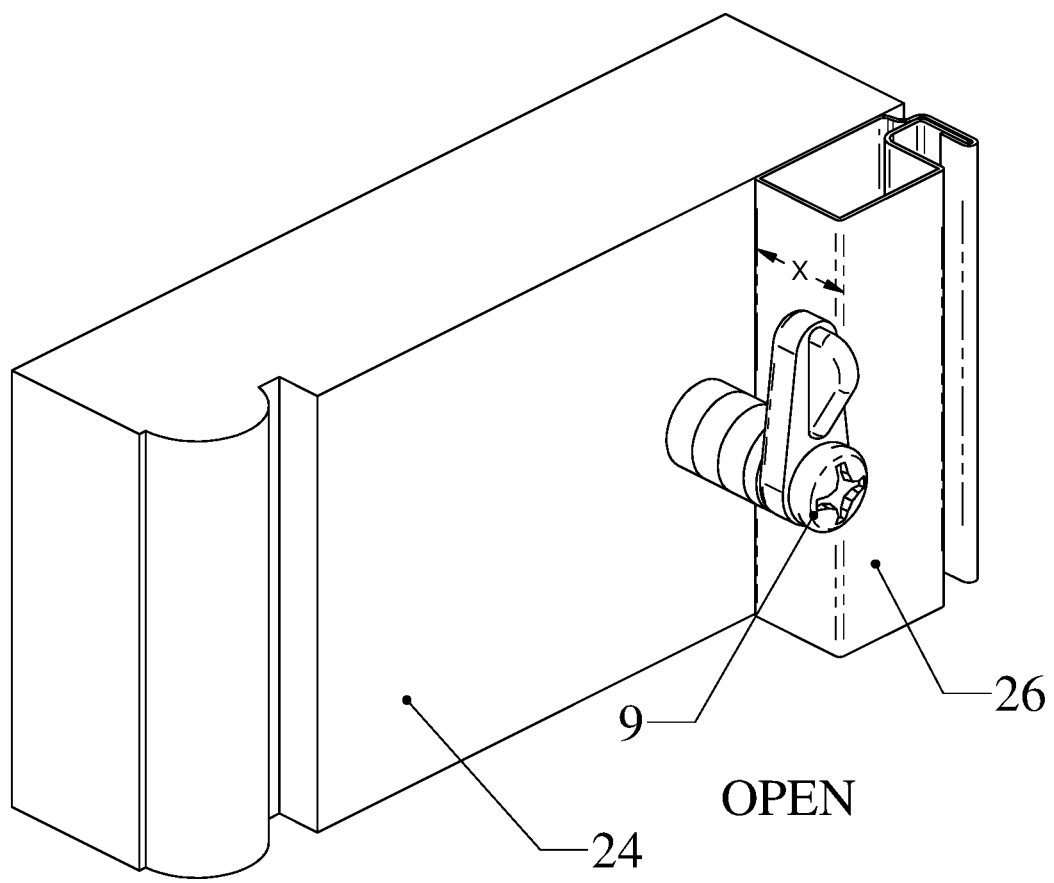
FIG. 5 is a perspective side view of a screen clip and attachable spacers installed in the open position.
Figure 6:
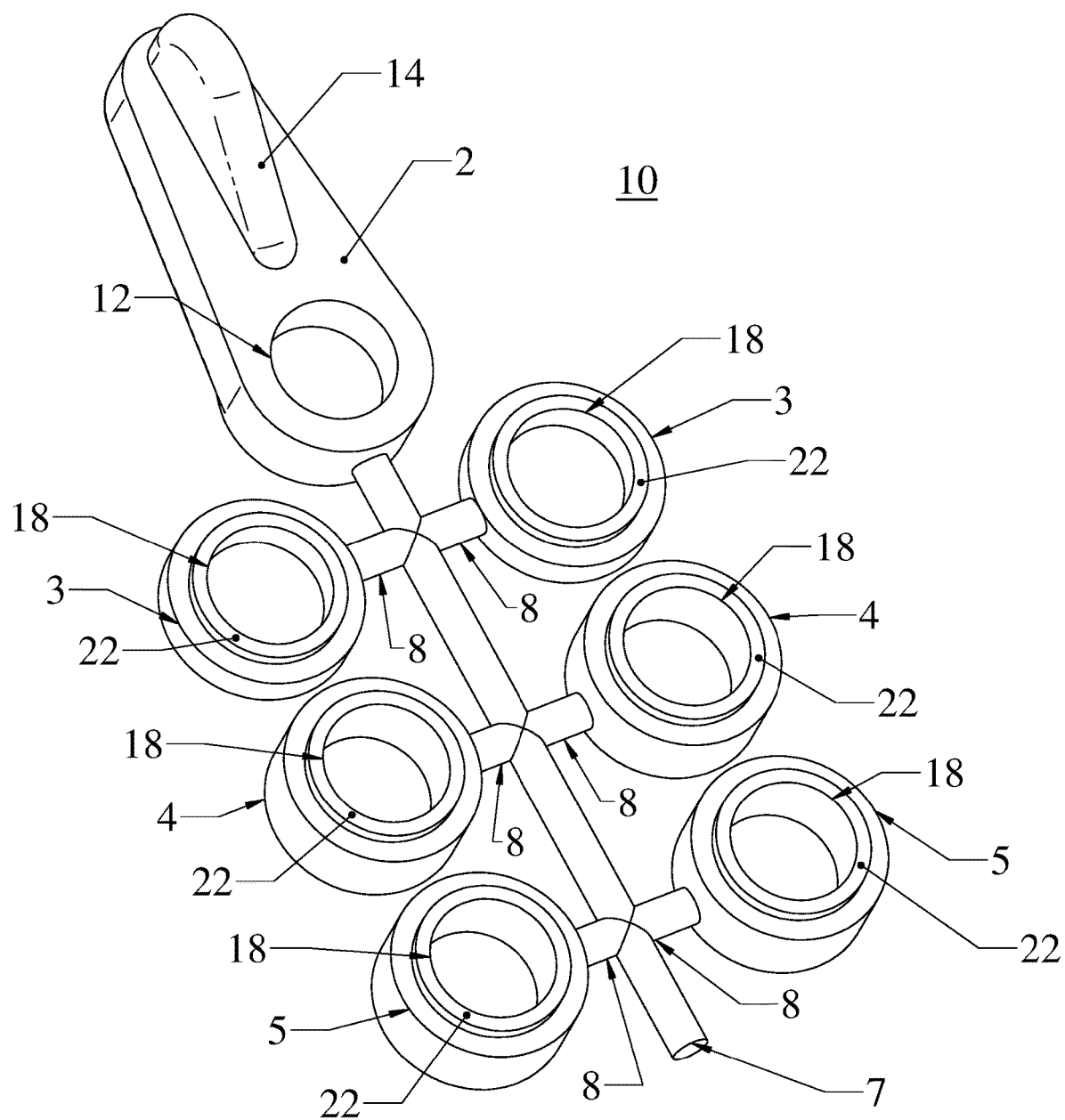
FIG. 6 is a perspective view of a screen clip and attachable spacers according to the invention prior to use.

According to the invention, a clip for fastening a screen to a frame is provided. The clip has a top and a bottom. An opening with a preselected diameter at one end of the clip is provided. The opening extends through the clip for receipt of a connector desirably a screw to attach the clip to a door frame or a window frame. The clip has a projection extending a preselected vertical distance from the clip top at the end opposite the clip receiving end. When installed, the projection holds a screen in place in a door or window frame. The clip bottom has a circular recess surrounding the opening. When a connector is mounted in the opening, the clip rotates about the connector and moves from a screen retention position (closed) where the projection engages the screen and holds the screen in place to a screen release position (open) where the screen can be removed.

One or more spacers can be attached to the bottom of the clip 10 adjacent the bottom of the clip opening 12. The spacers have a preselected diameter and a preselected vertical height. An opening preferably circular opening 18 is provided in each spacer for the connector 9 to pass through the spacers 3, 4, and or 5 as well as clip opening 12. Each attachable spacer bottom has a circular recess 20 surrounding the spacer opening 18. Each attachable spacer top has a protruding ring 22 that mates with the circular recess 20 on the clip bottom or with a circular recess 16 surrounding an attachable spacer opening 16. By including one or more of the attachable spacers, the vertical distance of the projection can be raised a desired amount so the projection contacts the screen and holds said screen in place when the clip is in the screen retention position. When assembled, the openings on the spacers and the clip are in alignment for receipt on the connector 9.

As best seen in FIGS. 1 to 5, a screen clip assembly 10 is provided According to the invention, retainer clip 2 is provided to retain a screen frame or storm window frame 6 into a recess or onto the surface surrounding an opening such as a window. The assembly 10 is comprised of a retainer clip 2 having an opening 12 for receipt of a connector preferably a screw 9 at one end and a projection 14 extending vertically from the top side of the of the retainer clip at the opposite end of the clip from the opening 12. The opening 12 is desirably about --- inches in diameter for receipt of a Phillips head or flat head screw or optionally a bolt.

A plurality of screen frame spacers 3, 4 and 5 having different vertical heights preferably two of each height are provided to interact with the retainer clip 2 to accommodate a variety installation circumstances. Desirably spacer 3 has a vertical height of about 0.25 in. spacer 4 has a vertical height of about 0.5 in. and spacer 6 has a vertical height of about 0.75 in. Desirably two spacers of each size are provided.

The screen clip bottom has a circular recess 16 surrounding the opening 12. As best seen in FIG. 1, a compact screen clip assembly 10 is provided by connecting one or more of screen frame spacers 3, 4, and/or 5 preferably six spacers to screen clip 2 temporarily through rod 7 and short connectors 8 to form a cohesive grouping that may be easily separated from the joining members 7, 8 to supply to the user a compact package for sale in for example a hardware store. In use, the screen clip 2 and one or more spacers 3, 4, and/or 5 interlocked to a stacked height according to the installer's need or desire. An opening is provided in each spacer for the connector preferably a screw 9 to pass through the spacers. Each attachable spacer bottom has a circular recess 16 surrounding the spacer opening. Each attachable spacer top has a protruding ring that mates with the circular recess on the clip 2 bottom or with a circular recess surrounding an attachable spacer opening. By including one or more of the attachable spacers, the vertical distance of the projection can be raised a desired amount so the projection contacts the screen and holds said screen in place when the clip is in the screen retention position The installation of the clip 2 requires measuring the distance x from the surface 24 on which the clip will be mounted to the surface of the screen frame 26 (FIGS. 4 and 5) furthest from the mounting surface 24. The spacers are separated to form a stack (see FIG. 3) equal to or greater than the distance x. A hole is drilled hole or a self-drilling screw is used to attach the clip 2 to the end closest to the center of the screen frame. The clips are usually attached by a screw 9 or other fasteners (FIG. 3 with enough pressure to hold the frame and still allow the clip 2 to swivel between the closed and open positions see FIGS. 3 and 4.

The screen clip device includes a compact presentation of the screen clip 2 and the attachable segments that function as spacers. Joining rods namely vertical rods 7 and horizontal rods 8 connect the attachable spacers to the screen clip 2 for easy packaging and deliver to the customer. The clip 2 is pulled off rod 8 by the consumer and as many spacers 3, 4 and/or 5 as required by the consumer are pull off to meet the measured distance x. The joining members are of the same material and coloration as the screen frame retainer clip and the grouped spacers. The screen clips are provided as an assembly which can be easily stored as an assembly, displayed on rack in a store. The numerous parts are kept together prior to use. Plastic parts molded together desirably are the same color. Unused spacers can be used for other installs.

In another aspect of the invention, a clip assembly 10 packaged for fastening a screen to a frame is provided. The clip assembly includes a clip 2 having a clip ton 62 and a clip bottom 60. The clip bottom 60 has an opening of a preselected diameter; The opening extends through the clip bottom for receipt of a connector to attach the clip to a door or window frame 24. The clip bottom 60 has a circular recess surrounding the opening. The clip rotates about the opening when a connector 9 is received in the opening by moving from a screen retention position to a screen release position or vis versa see FIGS. 4 and 5.

Desirably one or more spacers 3, 4 or 5 are attached to the clip bottom. The spacers have a top and a bottom; a preselected diameter and a preselected thickness; the spacers having an opening there through for receipt of a connector 9;

A projection 14 extends a preselected adjustable vertical distance from the clip top 62 for holding a screen 26 in place. The vertical distance is adjustable by varying the number of spacers 3, 4 and 5 attached to the clip bottom. The spacer bottom 60 has a circular recess surrounding the spacer opening. The spacer has a protruding ring that mates with the circular recess on said clip bottom or with a circular recess surrounding the spacer opening. One or more spacers 3, 4 or 5 raise the preselected vertical distance of the projection 14 a preselected amount depending on the number of spacers so the projection 14 contacts the screen 26 and holds the screen in place. A rod 7 connected to the clip and spacers 3, 4, 5 for separation therefrom prior to use is provided. The rod 7 has a plurality of spacers attached thereto whereby a cohesive compact grouping is formed for display in a store.

The foregoing is considered as illustrative only to the principals of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

The invention claimed is:

1. A clip assembly packaged for fastening a screen to a frame comprising:
   a) a clip having a clip top and a clip bottom;
   b) said clip bottom having an opening having a preselected diameter;
   c) said opening extending through said clip bottom for receipt of a connector to attach said clip to a door or window frame;
   d) said clip bottom having a circular recess surrounding said opening;
   e) said clip rotating about said opening when said connector is received in said opening by moving from a screen retention position to a screen release position or vice versa;
   f) one or more spacers attached to the clip bottom; said one or more spacers having a top and a bottom; a preselected diameter and a preselected thickness; said one or more spacers having circular through opening there through for receipt of said connector;
   g) a projection extending, a preselected adjustable vertical distance, from said clip top for holding a screen in place; said preselected adjustable vertical distance adjustable by varying the number of the one or more spacers attached to the clip bottom;
   h) said one or more spacers bottom having a circular recess surrounding said spacer circular through opening;
   i) said one or more spacers top having a protruding ring that mates with the circular recess on said clip bottom or with the circular recess surrounding said spacer circular through opening;
   j) said one or more spacers raise the preselected adjustable vertical distance of said projection a preselected amount depending on the number of said one or more spacers so said projection contacts said screen and holds said screen in place; and
   k) a rod connected to said clip to be separated therefrom prior to use; said rod having said one or more spacers attached thereto whereby a cohesive compact grouping is formed for display in a store.

2. The clip according to claim 1, where said one or more spacers are circular.

3. The clip according to claim 1, wherein said one or more spacers are attached to the clip bottom and raise the preselected adjustable vertical distance of said projection from 0.25 inch to 3.0 inch.

4. The clip according to claim 1, wherein at least two of the one or more spacers are attached to the clip bottom and raise the preselected adjustable vertical distance of said projection from 0.5 inch to 2.0 inch.

5. The clip according to claim 1, wherein at least two of the one or more spacers are removably attached to said clip by one or more horizontal rods to raise the preselected adjustable vertical distance of said projection.

6. The clip according to claim 1, wherein one or more spacers are removably attached to said clip by one of more horizontal rods to raise said preselected adjustable vertical distance when said one or more spacers have been separated from horizontal rods and attached to the clip bottom whereby a compact assembly is formed for display in a store.

7. The clip according to claim 1, wherein said one or more spacers openings and said clip opening are in alignment to simultaneously receive the connector.

* * * * *